United States Patent
Iwanaga et al.

(10) Patent No.: US 7,368,203 B2
(45) Date of Patent: May 6, 2008

(54) NONAQUEOUS ELECTROLYTE SECONDARY CELL

(75) Inventors: Masato Iwanaga, Tokushima (JP);
Kazuyasu Fujiwara, Tokushima (JP);
Ryuji Ohshita, Tokushima (JP);
Masayuki Terasaka, Hyogo (JP);
Masatoshi Takahashi, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 460 days.

(21) Appl. No.: 10/670,384

(22) Filed: Sep. 26, 2003

(65) Prior Publication Data

US 2004/0072080 A1 Apr. 15, 2004

(30) Foreign Application Priority Data

Sep. 30, 2002 (JP) ............... 2002-286059

(51) Int. Cl.
*H01M 10/40* (2006.01)
*H01M 4/58* (2006.01)

(52) U.S. Cl. ............... 429/330; 429/231.3; 429/231.95; 429/340

(58) Field of Classification Search ............ 429/231.3, 429/330, 340, 231.95
See application file for complete search history.

(56) References Cited

U.S. PATENT DOCUMENTS 6,503,662 B1 1/2003 Hamamoto et al.
6,632,572 B1 10/2003 Takahashi et al.
6,818,351 B2 * 11/2004 Sunagawa et al. ....... 429/231.3

FOREIGN PATENT DOCUMENTS

| JP | 9-120837 A | 5/1997 |
|---|---|---|
| JP | 11-121032 A | 4/1999 |
| JP | 3113652 B1 | 9/2000 |
| JP | 2001-167791 A | 6/2001 |
| JP | 2002-25611 A | 1/2002 |
| JP | 2002050398 A * | 2/2002 |
| JP | 2002110229 A * | 4/2002 |
| JP | 2002298909 A * | 10/2002 |

* cited by examiner

*Primary Examiner*—Gregg Cantelmo
(74) *Attorney, Agent, or Firm*—Westerman, Hattori, Daniels & Adrian, LLP.

(57) ABSTRACT

The present invention provides a non-aqueous electrolyte secondary cell that has good high-temperature cycle characteristics and good high-temperature standing resistance, and that is highly safe enough to prevent overcharge. The non-aqueous electrolyte secondary cell of the invention utilizes a non-aqueous electrolyte that includes a vinylene carbonate derivative, a cyclic sulfite derivative, and both/either of a phenylcycloalkane derivative and/or an alkylbenzene derivative having a quaternary carbon directly bonded to a benzene ring.

11 Claims, 2 Drawing Sheets

NONAQUEOUS ELECTROLYTE SECONDARY CELL

BACKGROUND OF THE INVENTION (1) Field of the Invention

The present invention relates to an improvement of non-aqueous electrolyte secondary cells.

(2) Description of the Prior Art

Non-aqueous electrolyte secondary cells represented by lithium ion secondary cells have high energy density and high capacity, and thus are widely used as the driving power sources of mobile information terminals.

Generally, non-aqueous electrolyte secondary cells use a positive electrode made of transition metal compound oxide containing lithium, a negative electrode made of carbon material such as graphite, and a non-aqueous electrolyte containing a lithium salt dissolved in a non-aqueous solvent that is made of chain carbonic acid ester or cyclic carbonic acid ester. In such cells, although there is migration of lithium ions between the positive electrode and the negative electrode upon charge and discharge, an internal short circuit caused by dendrite lithium does not occur because there is no generation of metal lithium. Therefore, such cells excel in safety.

However, such non-aqueous electrolyte secondary cells can be problematic in that decomposition of the non-aqueous solvent caused by a reaction between the non-aqueous solvent and the electrodes upon charge and discharge results in insufficient cycle characteristics. A particular problem is that in the case of overcharge, lithium ions are released excessively from the positive electrode and stored excessively in the negative electrode. This increases the reactiveness of the electrodes to the non-aqueous solvent, resulting in deterioration of cell characteristics.

In view of these problems, when using such cells, there is employed an overcharge preventive means that utilizes a current-cutting device. However, it takes long before conventional current-cutting devices operate because they operate only when the internal pressure of the cell increases, and thus there is a doubt as to ensuring safety in the case of an intense increase in internal cell temperature.

Proposed methods to solve the above problems include techniques of adding various additives that are capable of improving safety in the non-aqueous electrolyte. The following methods are those proposed to improve cycle characteristics:

(1) Forming a coating film on the surface of an electrode plate with the use of a non-aqueous electrolyte having vinylene carbonate and ethylene sulfite (see, for example, Patent Reference 1);

(2) Forming a coating film on the surface of an electrode plate with the use of a non-aqueous electrolyte having ethylene carbonate and ethylene sulfite (see, for example, Patent Reference 3, where the ethylene sulfite is referred to as glycol sulfite); and (3) Forming a coating film on the surface of an electrode plate with the use of a non-aqueous electrolyte having a tert-butylbenzene derivative (see, for example, Patent Reference 4).

Proposed methods to prevent overcharge include the following technique (4):

(4) Speeding up the response of the current-cutting device by adding in the non-aqueous electrolyte a phenylcycloalkane derivative provided with the ability to generate a gas by rapidly decomposing at the time of overcharge (see, for example, Patent Reference 5, where the phenylcycloalkane derivative is referred to as a cycloalkylbenzene derivative).

Patent Reference 1: Japanese Unexamined Patent Publication No. H11-121032 (pp. 2 to 3)

Patent Reference 2: Japanese Unexamined Patent Publication No. 2002-25611 (page 2)

Patent Reference 3: Japanese Unexamined Patent Publication No. H9-120837 (pp. 2 to 3)

Patent Reference 4: Japanese Unexamined Patent Publication No. 2001-167791 (pp. 2 to 3)

Patent Reference 5: Specification of Japanese Patent No. 3113652 (p.p 2 to 3)

However, the techniques (1) and (2) cannot satisfactorily inhibit the decomposition of the electrolyte solution when the cell is exposed to a high temperature (approximately 100° C.) or when charge and discharge are repeated at around the upper limit (40 to 60° C.) of normal use temperature of a cell. As a result, sufficient cycle characteristics cannot be obtained, and there is a danger of solution leakage caused by an increased internal pressure resulting from solvent decomposition, when the cell is exposed to a high temperature (approximately 100° C.). Furthermore, there is a problem of smoking or the like when the cell is heated abnormally by overcharge.

The technique of (3) is not sufficient in the effect of enhancing cycle characteristics because the coating film formed on the electrode plate is coarse, and there is a problem of smoking at the time of overcharge.

The technique of (4), although capable of preventing overcharge, allows gradual decomposition and polymerization of additives upon charge and discharge at around the upper limit (40 to 60° C.) of normal use temperature of a cell, so that the internal resistance of the cell is increased. This presents the problem of high cycle deterioration.

SUMMARY OF THE INVENTION

In view of the foregoing and other problems, it is an object of the present invention to provide a non-aqueous electrolyte secondary cell that is excellent in cycle characteristics (high temperature cycle characteristics) at around the upper limit (40 to 60° C.) of normal use temperature of a cell, and excellent in reliability (high temperature standing resistance) after left standing under a high temperature (approximately 100° C.).

(1) According to a first aspect of the present invention, there is provided a non-aqueous electrolyte secondary cell comprising a positive electrode intercalating and deintercalating lithium ions, a negative electrode intercalating and deintercalating lithium ions, and a non-aqueous electrolyte having a non-aqueous solvent and an electrolyte salt, wherein the non-aqueous electrolyte includes a vinylene carbonate derivative, a cyclic sulfite derivative, and a phenylcycloalkane derivative, or an alkylbenzene derivative having a quaternary carbon directly bonded to a benzene ring.

With the above construction, the vinylene carbonate derivative and cyclic sulfite derivative each react to the electrodes and form a stable coating film. This inhibits a reaction between the electrodes and non-aqueous solvent.

In a non-aqueous electrolyte secondary cell, uneven charge occurs; instead of uniformly charging the electrode plate, local overcharge occurs in a portion of the plate. The overcharged portion allows a reaction between the electrode plate and non-aqueous solvent, resulting in deterioration of cell characteristics. However, a phenylcycloalkane derivative is highly reactive to α hydrogen (hydrogen that is bonded to a carbon directly bonded to the benzene ring) in the cycloalkyl group, and thus this hydrogen is easily released at the time of overcharge. Then, the phenylcycloalkane derivative decomposes and polymerizes at the locally overcharged portion to form a coating film thereon. This inhibits further local overcharge. As a result, cycle characteristics at around the upper limit (40 to 60° C.) of the temperature of a normal cell is enhanced.

The phenylcycloalkane derivative, also at a high temperature (approximately 100° C.), allows the release of a hydrogen in the cycloalkyl group and generates a hydrogen gas, and the derivative itself polymerizes to form a highly resistant coating film. As a result, when the temperature of the cell becomes high, so do internal resistance and internal cell pressure, so that the safety device incorporated in the cell is operated to cut off electric current.

The phenylcycloalkane derivative also enhances safety at the time of overcharge, since it intensely increases internal resistance by the release of α hydrogen in the cycloalkyl group so that a hydrogen gas is generated, and by the polymerization of the derivative itself.

The alkylbenzene derivative having a quaternary carbon directly bonded to a benzene ring is highly stable at a high temperature (approximately 100° C.) and has the ability to consume, without intense gas generation, electric charges and radicals that promote decomposition and deterioration of the electrodes and non-aqueous solvent. Therefore, the derivative inhibits local discharge and a reaction between the electrodes and non-aqueous solvent at around the upper limit (40 to 60° C.) of the temperature of a normal cell or at a high temperature (approximately 100° C.).

(2) According to a second aspect of the present invention, there is provided a non-aqueous electrolyte secondary cell comprising a positive electrode intercalating and deintercalating lithium ions, a negative electrode intercalating and deintercalating lithium ions, a non-aqueous electrolyte having a non-aqueous solvent and an electrolyte salt, wherein the non-aqueous electrolyte includes a vinylene carbonate derivative, a cyclic sulfite derivative, a phenylcycloalkane derivative, and an alkylbenzene derivative having a quaternary carbon directly bonded to a benzene ring.

The above construction is more preferable because the obtained cell is provided with a combination of the effects of the phenylcycloalkane derivative and the alkylbenzene derivative having a quaternary carbon directly bonded to a benzene ring, i.e., the cell is excellent in high temperature cycle characteristics and safety at the time of overcharge.

(3) According to the first and second aspects, a positive electrode active material contained in the positive electrode may be a lithium cobalt compound oxide, and the positive electrode active material may have a bulk density of 3.3 g/cm$^3$ or more.

It is common practice to increase the bulk density of the active material in order to increase cell capacity. With an increase in the bulk density of the active material, however, the above-mentioned local overcharge easily occurs. According to the present invention, however, even when the bulk density of the positive electrode active material using lithium cobalt compound oxide is as high as 3.3 g/cm$^3$ or more, cycle characteristics are satisfactorily maintained. This is because the phenylcycloalkane derivative and alkylbenzene derivative having a quaternary carbon directly bonded to a benzene ring inhibit the local overcharge. Note that although lithium cobalt compound oxide is represented by the general formula LiCoO$_2$, oxide in which a part of cobalt is substituted by another element can be used to obtain a similar effect.

(4) According to the first and second aspects of the invention, when a total mass of the non-aqueous solvent and the electrolyte salt is taken as 100, an amount of the vinylene carbonate derivative is 0.5 to 3 parts by mass per 100 total mass of the non-aqueous solvent and the electrolyte salt, and the amount of the cyclic sulfite derivative is 0.1 to 2 parts by mass per 100 total mass of the non-aqueous solvent and the electrolyte salt.

If the added amount of the vinylene carbonate derivative is less than 0.5 part by mass per 100 total mass of the non-aqueous solvent and the electrolyte salt, the coating material formed on the electrode plate becomes coarse, failing to obtain sufficient high-temperature cycle characteristics. If the vinylene carbonate derivative is more than 3 parts by mass, the coating material formed on the electrode plate becomes dense, resulting in excessive electric resistance. Thus, it is preferable that the amount of the vinylene carbonate derivative is 0.5 to 3 parts by mass per 100 total mass of the non-aqueous solvent and the electrolyte salt.

If the total added amount of the phenylcycloalkane derivative and the alkylbenzene derivative having a quaternary carbon directly bonded to a benzene ring is less than 0.2 part by mass per 100 total mass of the non-aqueous solvent and the electrolyte salt, high temperature cycle characteristics cannot be sufficiently enhanced. If the total added amount of the phenylcycloalkane derivative and the alkylbenzene derivative having a quaternary carbon directly bonded to a benzene ring is more than 3 parts by mass, these additives increase internal resistance, resulting in deterioration of cycle characteristics. Thus, it is preferable that the total added amount of the compounds is 0.2 to 3 parts by mass per 100 total mass of the non-aqueous solvent and the electrolyte salt.

Note that an alkylbenzene derivative that has both a cycloalkyl group and a quaternary carbon directly bonded to a benzene ring functions mainly as a phenylcycloalkane derivative, although the reason therefor is unknown. For this reason, this compound will be treated as a kind of the phenylcycloalkane derivative. Also note that an alkylbenzene derivative having a quaternary carbon directly bonded to a benzene ring will be defined as not having a cycloalkyl group directly bonded to a benzene ring.

The vinylene carbonate derivative is not particularly specified; however, it is possible to advantageously use, for example, a compound having a structure represented by the following Chemical Formula 1.

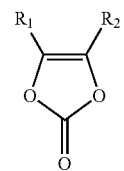

[Chemical Formula 1]

(where R1 and R2 are independently a hydrogen atom or an alkyl group with two carbons or less).

As the cyclic sulfite derivative, it is possible to advantageously use an ethylene sulfite derivative having a structure represented by the following Chemical Formula 2 and a vinylene sulfite derivative having a structure represented by the following Chemical Formula 3. It is also possible to use a mixture of these derivatives.

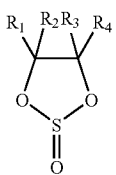

[Chemical Formula 2]

(where R1 to R4 are independently a hydrogen atom or an alkyl group with two carbons or less).

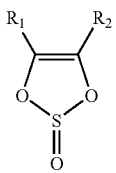

[Chemical Formula 3]

(where R1 and R2 are independently a hydrogen atom or an alkyl group with two carbons or less).

The phenylcycloalkane derivative is not particularly specified; however, it is possible to advantageously use, for example, phenylcyclohexane, phenylcycloheptane, or phenylcyclopentane.

The alkylbenzene derivative having a quaternary carbon directly bonded to a benzene ring is not particularly specified; however, it is possible to advantageously use, for example, tert-butylbenzene, tert-amylbenzene, or tert-hexylbenzene.

DESCRIPTION OF THE PREFERRED EMBODIMENTS

Embodiments of the present invention will be described with reference to the drawings. Note that the present invention is not limited to the following embodiments; it should be appreciated that variations are possible within the scope of the invention.

Figure 1:
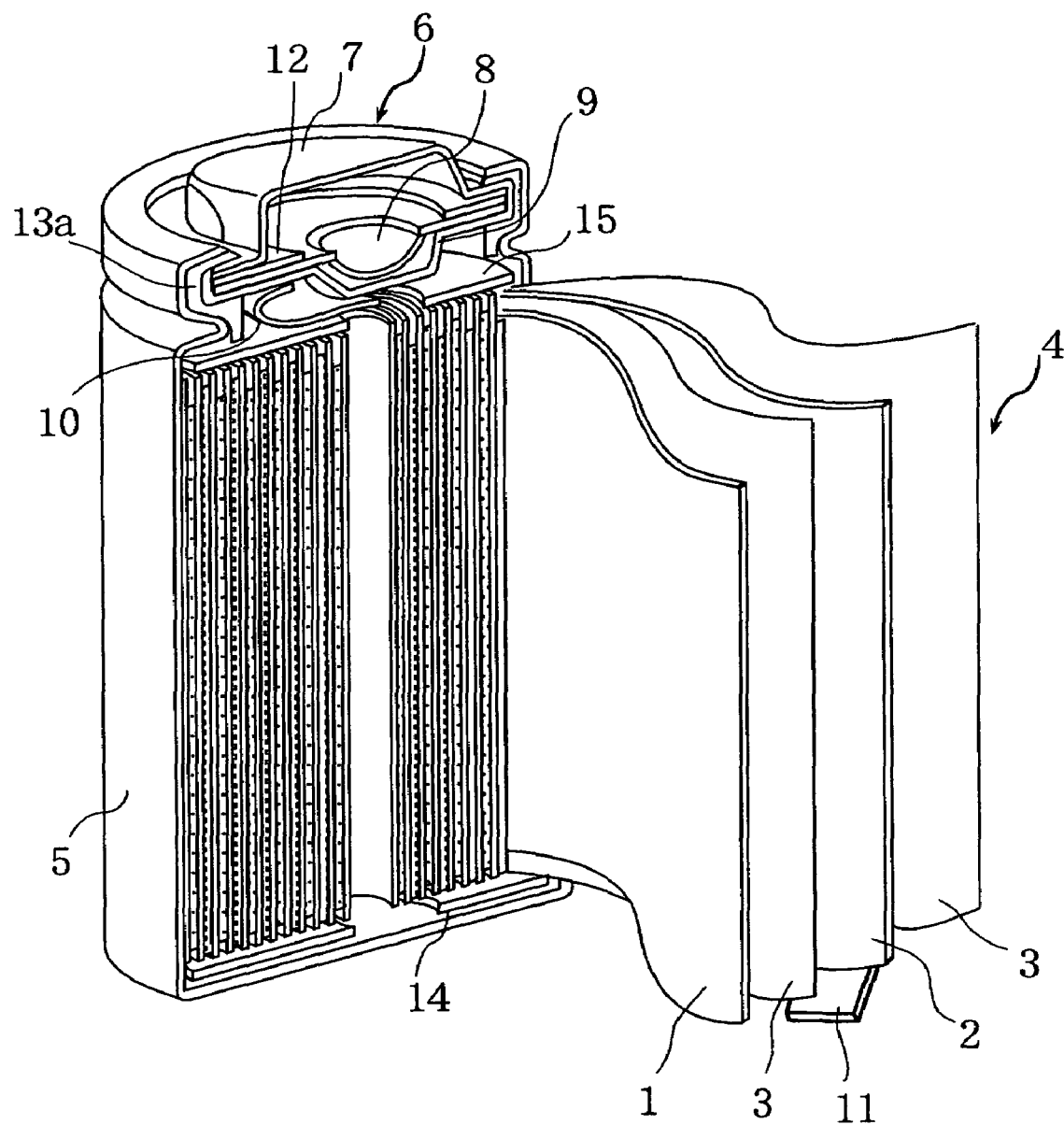
FIG. 1 is an exploded perspective view of a non-aqueous electrolyte secondary cell according to the present invention.
Figure 2:
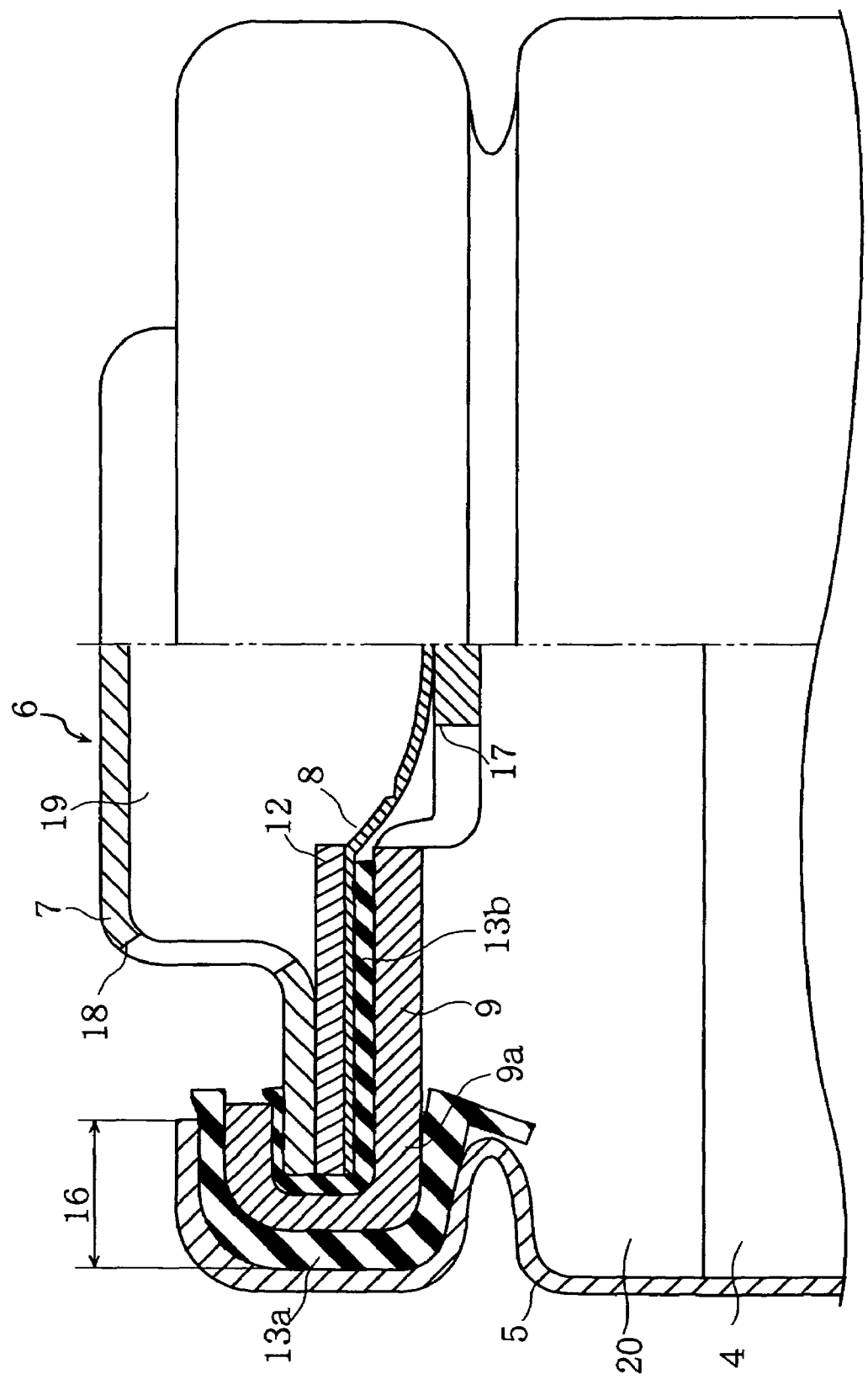
FIG. 2 is an enlarged semi-sectional view of the sealing structure of the non-aqueous electrolyte secondary cell according to the present invention.

FIG. 1 is an exploded perspective view of a non-aqueous electrolyte secondary cell according to an embodiment of the present invention. FIG. 2 is an enlarged semi-sectional view of the current-cutting sealing structure provided at the opening portion of the outer casing can shown in FIG. 1.

As shown in FIG. 1, a lithium ion cell according to an example of the present invention has a cylindrical outer casing can 5 provided with a bottom. In the outer casing can 5 is mounted a spiral-shaped electrode assembly 4 composed of a positive electrode 1, a negative electrode 2, and a separator 3 that separates the electrodes 1 and 2. Further in the outer casing can 5, an electrolyte solution in which an electrolyte salt is dissolved is injected. To the opening portion of the outer casing can 5, a sealing structure 6 is caulked and fixed with the intervention of an insulating outer gasket 13a made of polypropylene (PP). Thus, the cell is sealed by the sealing structure 6.

The sealing structure 6, as shown in FIG. 2, has a sealing plate 9 made of an aluminum alloy. To the sealing plate 9, an explosion-proof valve 8 that has an approximately hemisphere center portion and is made of an aluminum alloy, a PTC element 12, and a terminal cap 7 provided with a gas releasing hole 18 are caulked and fixed with the intervention of an insulating inner gasket 13b made of PP. The explosion-proof valve 8 delimits an inner portion of the sealing portion 19 and a body portion 20 (the portion in which the electrode assembly 4 is mounted) of the cell. In a normal state, the explosion-proof valve 8 is electrically connected to the sealing plate 9, and when abnormality such as overcharge occurs and an internal cell pressure exceeds a predetermined value, the valve 8 separates from the sealing plate 9 due to the internal cell pressure in order to discontinue the charge.

To the outer casing can 5, a negative current collector tab 11 electrically connected to the negative electrode 2 is connected, and to the sealing plate 9 of the sealing structure 6, a positive current collector tab 10 is connected. Thus, chemical energy generated inside the cell is turned into electric energy that is brought outside. At near both top and bottom end portions of the electrode assembly 4, insulation plates 14 and 15 for preventing a short circuit inside the cell are disposed.

In the above electrolyte solution, a vinylene carbonate derivative, a cyclic sulfite derivative, and a phenylcycloalkane derivative and/or an alkylbenzene derivative having a quaternary carbon directly bonded to a benzene ring are added.

Note that the material of the sealing plate 9 is not limited to the above aluminum alloy; it is also possible to use metal aluminum, iron, stainless, or the like.

The present invention will be further detailed with the use of Examples.

First, cells according to Examples 1-1 to 1-3 and Comparative Examples 1-1 and 1-2 were prepared. Then, using these cells, the composition of an additive in relation to high temperature cycle characteristics and high temperature standing resistance will be described.

EXAMPLE 1-1

Eighty five parts by mass positive electrode active material made of lithium cobalt oxide ($LiCoO_2$), 10 parts by mass carbon-based conductivity enhancer made of acetylene black, 5 parts by mass binder made of polyvinylidene fluoride (PVdF), and N-methyl-2-pyrrolidone (NMP) were mixed to obtain an active material slurry.

This active material slurry was uniformly applied on both sides of a positive electrode substrate made of an aluminum foil of 20 μm thick by doctor blade, and then was dried by passing it through the inside of a heated dryer. By this drying step, an organic solvent required in the step of preparing the slurry was removed. Subsequently, the electrode plate was rolled with the use of a roll press machine so that the thickness of the electrode plate was made 0.17 mm, and thus, a positive electrode 1 was prepared. Active material bulk density was 3.5 g/cm$^3$, and active material relative surface area was 0.85 m$^2$/g.

Ninety eight parts by mass negative electrode material made of graphite and a dispersion of styrene-butadiene rubber (SBR) with 48% of solid content were dispersed in water, and further, carboxymethyl cellulose (CMC) for serving as a thickener was appropriately added therein. Thus, a negative electrode active material slurry was prepared. This negative electrode active material slurry was adjusted in order to have a post-drying mass composition ratio of solid content such that graphite (excluding the amount of the conductivity enhancer):SBR:CMC=98:1:1.

This negative material slurry was uniformly applied on both sides of a negative electrode substrate made of a copper foil of 20 μm thick by doctor blade, and then was dried by passing it through the inside of a heated dryer. By this drying step, moisture required in the step of preparing the slurry was removed. Subsequently, the electrode plate was rolled with the use of a roll press machine so that the thickness of the electrode plate was made 0.14 mm, and thus, a negative electrode 2 was prepared.

Thirty five parts by mass ethylene carbonate (EC) and 65 parts by mass diethyl carbonate (DEC) were mixed to prepare a mixture solvent, and $LiPF_6$ for serving as electrolyte salt was dissolved in the mixture solvent at a concentration of 1M (mol/liter). In this mixture solvent, 2 parts by mass vinylene carbonate (VC), 0.5 part by mass ethylene sulfite (ES), and 2 parts by mass phenylcyclohexane (PCH) were added. Thus, an electrolyte solution was prepared.

Next, the electrode assembly 4 was prepared by winding the positive electrode 1 and the negative electrode 2 with the separator 3 (25 μm thick) made of a microporous film of polyethylene interposed therebetween. Then, the electrode assembly 4 was enclosed in the outer casing can 5 together with the insulation plate 14, and the negative current collector tab 11 was welded to the bottom of the outer casing can 5.

Then, the explosion-proof valve 8, the PTC element 12, and the terminal cap 7 were caulked and fixed to the sealing plate 9 with the intervention of an inner gasket 15. Thus, the inner portion 20 of the sealing structure was sealed. Then, the positive current collector tab 10 was welded to the sealing plate 6, and an electrolyte solution prepared in the above manner was injected into the outer casing can 5. Then, the sealing plate 6 was caulked and fixed to the opening end portion of the outer casing can 5 with the intervention of the outer gasket 13a. Thus, a cell A1 of the present invention according to Example 1-1 was prepared. The design capacity of the cell thus prepared was 2100 mAh.

EXAMPLE 1-2

A cell A2 of the present invention according to Example 1-2 was prepared in the same manner as Example 1-1 except that 3 parts by mass tert-amylbenzene (TAB) was added instead of phenylcyclohexane.

EXAMPLE 1-3

A cell A3 of the present invention according to Example 1-3 was prepared in the same manner as Example 1-1 except that 1 part by mass phenylcyclohexane and 1 part by mass tert-amylbenzene (TAB) were added.

COMPARATIVE EXAMPLE 1-1

A comparison cell X1 of the present invention according to Comparative Example 1-1 was prepared in the same manner as Example 1-1 except that phenylcyclohexane was not added.

COMPARATIVE EXAMPLE 1-2

A comparison cell X2 of the present invention according to Comparative Example 1-2 was prepared in the same manner as Example 1-1 except that ethylene sulfite was not added but 2 parts by mass phenylcyclohexane was added.

<Cell Characteristics Tests>

With respect to the cells A1 and A2 of the present invention and the comparison cells X1 and X2, high temperature cycle tests and high temperature standing tests were conducted under the following conditions.

<High Temperature Cycle Tests>

Charge conditions: constant current of 1 I t (2100 mA); constant voltage of 4.2 V; termination current of 3 mA; and 40° C.

Discharge conditions: constant current of 1 I t (2100 mA); termination current of 2.75 V; and 40° C.

High temperature cycle characteristics capacity maintenance rate (%): (300 cycles discharge capacity/1 cycle discharge capacity)×100

<High Temperature Standing Tests>

A fully-charged cell was left standing for 8 hours at 105° C., and then an inspection for solution leakage and current cutting-off was conducted.

The following Table 1 shows the composition of an additive in relation to high temperature cycle characteristics and high temperature standing resistance.

TABLE 1

| | additive composition (wt. %) | | | | cycle characteristics capacity maintenance | high temperature standing tests results | | |
|---|---|---|---|---|---|---|---|---|
| cell | VC | ES | PCH | TAB | rate (%) | solution leakage | current cutting-off | evaluation |
| X1 | 2.0 | 0.5 | 0.0 | 0.0 | 61 | found | found | bad |
| X2 | 2.0 | 0.0 | 2.0 | 0.0 | 55 | found | found | bad |
| A1 | 2.0 | 0.5 | 2.0 | 0.0 | 85 | not found | found | good |
| A2 | 2.0 | 0.5 | 0.0 | 3.0 | 81 | not found | not found | excellent |
| A3 | 2.0 | 0.5 | 1.0 | 1.0 | 83 | not found | not found | excellent |

In Table 1 above, the case where solution leakage occurred was evaluated bad, the case where solution leakage did not occur but current was cut off was evaluated good, and the case where neither solution leakage nor current cutting-off occurred was evaluated excellent.

As shown in Table 1, the cell A1 of the present invention, in which only vinylene carbonate (VC); ethylene sulfite (ES); and phenylcyclohexane (PCH) were added, obtained high temperature cycle characteristics of greater than 80% and reliability (such that an internal pressure rise cuts off current but solution leakage does not occur) at the time of being left standing under a high temperature.

This can be explained as follows.

Generally, when a cell is charged, the electrode plate is not uniformly charged; instead, local overcharge occurs in a portion of the plate. Although a coating film derived from vinylene carbonate and ethylene sulfite inhibits a reaction between the electrodes and the solvent, it does not have the function of cutting off overcharge.

On the other hand, phenylcyclohexane is highly reactive to a hydrogen (hydrogen that is bonded to carbon directly bonded to the benzene ring) in the cyclohexyl group, and thus allows the release of this a hydrogen at the locally overcharged portion and interpolymerizes to form thereon a stable coating film that is capable of preventing the permeation of lithium ions. This eliminates such locally overcharged portions and inhibits the decomposition of the electrolyte solution at the portions, realizing satisfactory cycle characteristics. In addition, at a high temperature (105° C.) above normal use conditions, phenylcyclohexane rapidly decomposes to generate a hydrogen gas and interpolymerizes to form a highly resistant coating film. Although this rapidly increases an internal cell pressure and causes the operation of the current cutting-off sealing structure, since the coating film prevents a reaction between the solvent and the electrodes, solution leakage does not occur.

As for the cell A2, in which vinylene carbonate; ethylene sulfite; and tert-amylbenzene (TAB) were added, such results were obtained that high temperature cycle characteristics were 81%, and there were neither solution leakage nor current cutting-off.

This can be explained as follows.

Tert-amylbenzene is highly stable at a high temperature (105° C.) and has the ability to consume, without intense gas generation, potentials and radicals that promote the decomposition/deterioration of the electrodes and non-aqueous solvent. As a result, local overcharge is alleviated at the time of charge and discharge at around the upper limit (40° C.) of normal use temperature of a cell and at a high temperature (105° C.), and the electrodes and non-aqueous solvent are inhibited from reacting to each other.

As for the cell 3, in which vinylene carbonate; ethylene sulfite; phenylcyclohexane; and tert-amylbenzene (TAB) were added, such results were obtained that high temperature cycle characteristics were 83%, and there were neither solution leakage nor current cutting-off.

This can be explained as follows.

In the cell A3, in which phenylcyclohexane and tert-amylbenzene were added, the coating film derived from the tert-amylbenzene alleviated local overcharge, and thus a hydrogen gas derived from the phenylcyclohexane was reduced. Thus, it is considered that the current cutting-off sealing structure did not operate.

In the cell X1, in which only vinylene carbonate (VC) and ethylene sulfite (ES) were added, and in the cell X2, in which only vinylene carbonate (VC) and phenylcyclohexane (PCH) were added, high-temperature cycle characteristics were insufficient and solution leakage was found.

This can be explained as follows.

In X1, the coating film formed of vinylene carbonate and ethylene sulfite cannot sufficiently prevent a reaction between the negative electrode and solvent at around the upper limit (40° C.) of normal use temperature of a cell. It is therefore considered that gradual decomposition of the solvent resulted in a decrease in cycle characteristics, and that at a high temperature (105° C.), an increased internal cell pressure cut off current and the development of the reaction between the negative electrode and solvent after the cutting-off of current resulted in solution leakage.

In X2, on the other hand, the coating film formed of the vinylene carbonate was coarse, and thus the phenylcyclohexane gradually decomposed and polymerized at around the upper limit (40° C.) of normal use temperature of a cell and formed a highly resistant coating film, resulting in a decrease in cycle characteristics. In addition, at a high temperature (105° C.), the phenylcyclohexane quickly decomposed to generate a hydrogen gas and the current cutting-off sealing structure was operated, so that current was cut off. After the cutting-off of current, the reaction between the solvent and electrode progressed. This is considered to be responsible for the solution leakage.

Next, using the cells of Examples 1-1 to 1-3 and Comparative Example 1-1, and using cells prepared in the following Examples 2-1 to 2-6, the added amount of the phenylcycloalkane derivative and the added amount of the alkylbenzene derivative having a quaternary carbon directly bonded to a benzene ring will be described in relation to high temperature cycle characteristics and safety in the overcharge test.

EXAMPLE 2-1

A cell B1 of the present invention according to Example 2-1 was prepared in the same manner as Example 1-1 except that ~0.2 part by mass phenylcyclohexane was added and tert-amylbenzene was not added.

EXAMPLE 2-2

A cell B2 of the present invention according to Example 2-2 was prepared in the same manner as Example 1-1 except that 0.5 part by mass phenylcyclohexane was added and tert-amylbenzene was not added.

EXAMPLE 2-3

A cell B3 of the present invention according to Example 2-3 was prepared in the same manner as Example 1-1 except that 3.0 parts by mass phenylcyclohexane was added and tert-amylbenzene was not added.

EXAMPLE 2-4

A cell B4 of the present invention according to Example 2-4 was prepared in the same manner as Example 1-1 except that 5.0 parts by mass phenylcyclohexane was added and tert-amylbenzene was not added.

EXAMPLE 2-5

A cell B5 of the present invention according to Example 2-5 was prepared in the same manner as Example 1-1 except that 2.0 parts by mass tert-amylbenzene was added.

EXAMPLE 2-6

A cell B6 of the present invention according to Example 2-6 was prepared in the same manner as Example 1-1 except that 4.0 parts by mass tert-amylbenzene was added.

With respect to the cells A1 to A3, B1 to B6, and X1, overcharge tests were conducted under the following conditions, and high temperature cycle tests were conducted under the same conditions as Example 1.

<Overcharge Tests>

Overcharge was conducted with a charge current of 1 I t (2100 mA), and the case where cell abnormality such as smoking occurred was evaluated bad, and the case where the overcharge stopped without cell abnormality was evaluated good.

Table 2 shows the added amounts of phenylcyclohexane (TCH) and tert-amylbenzene (TAB) in relation to high temperature cycle characteristics and the results of the overcharge tests.

TABLE 2

| cell | added amount (wt. %) | | cycle characteristics capacity maintenance rate (%) | overcharge tests results |
|---|---|---|---|---|
| | PCH | TAB | | |
| X1 | 0.0 | 0.0 | 61 | bad |
| B1 | 0.2 | 0.0 | 85 | bad |
| B2 | 0.5 | 0.0 | 84 | good |
| A1 | 2.0 | 0.0 | 85 | good |
| B3 | 3.0 | 0.0 | 80 | good |
| B4 | 5.0 | 0.0 | 66 | good |
| A2 | 0.0 | 3.0 | 81 | bad |
| A3 | 1.0 | 1.0 | 83 | good |
| B5 | 1.0 | 2.0 | 81 | good |
| B6 | 1.0 | 4.0 | 69 | good |

As shown in Table 2, there was no leakage found in the cells B3 and B6, in which the total added amount of phenylcyclohexane (TCH) and tert-amylbenzene (TAB) was over 3.0 parts by mass, when they were left standing under a high temperature. However, high temperature cycle characteristics lowered down to less than 69%. It is probable that this is because the added amounts of the additives were excessive, and thus the additives increased internal resistance.

On the other hand, in the cells A1 to A3, B1 to B3, and B5, in which the total added amount of phenylcyclohexane and tert-amylbenzene was 0.2 to 3.0 parts by mass, high temperature cycle characteristics of 80% or greater and cells having satisfactory performance were obtained. Thus, it is preferable that the total added amount of phenylcyclohexane and tert-amylbenzene is restricted to 0.2 to 3.0 parts by mass.

Furthermore, in the cells A1, A3, B2, B3, and B5, in which the added amount of phenylcyclohexane was 0.5 part by mass or more and the total added amount of phenylcyclohexane and tert-amylbenzene (TAB) was 3.0 parts by mass or less, high temperature cycle characteristics of 80% or greater and safety without smoking caused by overcharge were obtained. Thus, it is more preferable that the added amount of phenylcyclohexane is 0.5 part by mass or more, and the total added amount of phenylcyclohexane and tert-amylbenzene (TAB) is restricted to 3.0 parts by mass or less.

These tests show the following findings. Both phenylcycloalkane and alkylbenzene having a quaternary carbon directly bonded to a benzene ring are excellent in high temperature standing resistance. However, the addition of the phenylcycloalkane cuts off current because of an intense increase in an internal cell pressure, making it impossible to reuse the cell. On the other hand, the addition of the alkylbenzene having a quaternary carbon directly bonded to a benzene ring does not increase an internal cell pressure intensely after left standing under a high temperature, and maintains a voltage. Thus, in terms of cell longevity, the alkylbenzene having a quaternary carbon directly bonded to a benzene ring is superior. In the overcharge tests, however, the addition of the alkylbenzene having a quaternary carbon directly bonded to a benzene ring had a small effect of preventing overcharge, while the addition of the phenylcycloalkane intensely increased an internal pressure and internal resistance at the time of overcharge, so that current was cut off. Thus, in terms of preventing overcharge, the phenylcycloalkane is superior. It is more preferable that both of the above two additives are added in a cell, where the effects of both of them are obtained.

Next, using the cells prepared in Examples 1-1, 1-3, Comparative Example 1-2, the following Examples 3-1 to 3-10, and Comparative Example 3-1, the added amount of cyclic sulfite in relation to high temperature cycle characteristics and discharge storage test characteristics will be described.

EXAMPLE 3-1

A cell C1 of the present invention according to Example 3-1 was prepared in the same manner as Example 1-1 except that 0.1 part by mass ethylene sulfite was added.

EXAMPLE 3-2

A cell C2 of the present invention according to Example 3-2 was prepared in the same manner as Example 1-1 except that 1.0 part by mass ethylene sulfite was added.

EXAMPLE 3-3

A cell C3 of the present invention according to Example 3-3 was prepared in the same manner as Example 1-1 except that 1.5 parts by mass ethylene sulfite was added.

EXAMPLE 3-4

A cell C4 of the present invention according to Example 3-4 was prepared in the same manner as Example 1-1 except that 2.0 parts by mass ethylene sulfite was added.

EXAMPLE 3-5

A cell C5 of the present invention according to Example 3-5 was prepared in the same manner as Example 1-1 except that 3.0 parts by mass ethylene sulfite was added.

EXAMPLE 3-6

A cell C6 of the present invention according to Example 3-6 was prepared in the same manner as Example 1-3 except that 0.1 part by mass ethylene sulfite was added.

EXAMPLE 3-7

A cell C7 of the present invention according to Example 3-7 was prepared in the same manner as Example 1-3 except that 1.0 part by mass ethylene sulfite was added.

EXAMPLE 3-8

A cell C8 of the present invention according to Example 3-8 was prepared in the same manner as Example 1-3 except that 1.5 parts by mass ethylene sulfite was added.

EXAMPLE 3-9

A cell C9 of the present invention according to Example 3-9 was prepared in the same manner as Example 1-3 except that 2.0 parts by mass ethylene sulfite was added.

EXAMPLE 3-10

A cell C10 of the present invention according to Example 3-10 was prepared in the same manner as Example 1-3 except that 3.0 parts by mass ethylene sulfite was added.

COMPARATIVE EXAMPLE 3-1

A cell Y1 according to Comparative Example 3-1 was prepared in the same manner as Example 1-3 except to add no ethylene sulfite.

<Cell Characteristics Tests>

With respect to the cells A1, A3 of the present invention and the comparison cells X2 and Y1, discharge storage tests under the following conditions were conducted and high temperature cycle tests were conducted under the same conditions as Example 1.

<Discharge Storage Tests>

Cells in the state of discharge were preserved for 20 days in 60° C., followed by the measurement of pre- and post-storage open-circuit voltages.

Table 3 shows the added amount of ethylene sulfite (ES) in relation to high temperature cycle characteristics and the results of the discharge storage tests.

TABLE 3

| cell | amount of ES added (wt. %) | cycle characteristics capacity maintenance rate (%) | open-circuit voltage (V) before and after discharge storage | | |
|------|------|------|------|------|------|
| | | | before storage | after storage | voltage difference |
| X2  | 0.0 | 55 | 3.45 | 3.32 | −0.13 |
| C1  | 0.1 | 70 | 3.44 | 3.30 | −0.14 |
| A1  | 0.5 | 85 | 3.44 | 3.29 | −0.15 |
| C2  | 1.0 | 87 | 3.44 | 3.24 | −0.20 |
| C3  | 1.5 | 85 | 3.44 | 2.68 | −0.76 |
| C4  | 2.0 | 82 | 3.44 | 2.02 | −1.42 |
| C5  | 3.0 | 66 | 3.42 | 1.97 | −1.45 |
| Y1  | 0.0 | 55 | 3.45 | 3.30 | −0.15 |
| C6  | 0.1 | 67 | 3.44 | 3.31 | −0.13 |
| A3  | 0.5 | 83 | 3.43 | 3.26 | −0.17 |
| C7  | 1.0 | 86 | 3.44 | 3.20 | −0.24 |
| C8  | 1.5 | 84 | 3.43 | 2.59 | −0.84 |
| C9  | 2.0 | 79 | 3.44 | 1.90 | −1.54 |
| C10 | 3.0 | 64 | 3.42 | 1.84 | −1.58 |

As shown in Table 3, in the cells X2, Y1, C5, and C10, in which the added amount of ethylene sulfite (ES) was less than 0.1 part by mass or over 2.0 parts by mass per 100 total mass of the non-aqueous solvent and electrolyte salt, insufficient cycle characteristics of 55 to 66% were obtained. On the other hand, in the cells A1, A3, C1 to C4, and C6 to C9, in which the added amount of ethylene sulfite was in the range of 0.1 to 2.0 parts by mass, satisfactory cycle characteristics of 67 to 87% were obtained. When the added amount of ethylene sulfite (ES) was in the range of 0.5 to 2.0 parts by mass, more satisfactory cycle characteristics of 79 to 87% were obtained. This is probably because of the following reason. When the added amount of ethylene sulfite is less than 0.1 part by mass, the coating film formed of ES becomes coarse, making it impossible to sufficiently inhibit the decomposition of the non-aqueous solvent. On the other hand, when the added amount of ethylene sulfite (ES) is over 2.0 parts by mass, the coating film formed of ES becomes dense, increasing internal resistance. Thus, the added amount of ethylene sulfite (ES) is preferably 0.1 to 2.0 parts by mass, and more preferably 0.5 to 2.0 parts by mass per 100 total mass of the non-aqueous solvent and electrolyte salt, when a total mass of the non-aqueous solvent and electrolyte salt is taken as 100.

In the cells C4, C5, C9 and C10, in which the added amount of ethylene sulfite (ES) was over 1.0 part by mass, it was found that open-circuit voltage after the high temperature storage lowered down to 2.59 V. It is probable that this is because the excessive ethylene sulfite caused a reaction between the ethylene sulfite and electrodes at the time of the overcharge storage, resulting in consumption of charges. Thus, it is more preferable that the added amount of ethylene sulfite (ES) is 0.5 to 1.0 part by mass per 100 total mass of the non-aqueous solvent and electrolyte salt, when a total mass of the non-aqueous solvent and electrolyte salt is taken as 100.

Next, using the cells prepared in Example 1-3, Comparative Example 1-1, the following Examples 4-1 to 4-6, and Comparative Examples 4-1 to 4-6, the bulk density of the positive electrode active material will be described in relation to high temperature cycle characteristics.

EXAMPLE 4-1

A cell D1 of the present invention according to Example 4-1 was prepared in the same manner as Example 1-3 except that the bulk density of the positive electrode active material was made 3.0 g/cm$^3$. Note that the positive electrode active material had a relative surface area of 0.73 m$^2$/g and a design capacity of 1900 mAh.

EXAMPLE 4-2

A cell D2 of the present invention according to Example 4-2 was prepared in the same manner as Example 1-3 except that the bulk density of the positive electrode active material was made 3.1 g/cm$^3$. Note that the positive electrode active material had a relative surface area of 0.74 m$^2$/g and a design capacity of 1900 mAh.

EXAMPLE 4-3

A cell D3 of the present invention according to Example 4-3 was prepared in the same manner as Example 1-3 except that the bulk density of the positive electrode active material was made 3.2 g/cm$^3$. Note that the positive electrode active material had a relative surface area of 0.76 m$^2$/g and a design capacity of 1950 mAh.

EXAMPLE 4-4

A cell D4 of the present invention according to Example 4-4 was prepared in the same manner as Example 1-3 except that the bulk density of the positive electrode active material was made 3.3 g/cm$^3$. Note that the positive electrode active material had a relative surface area of 0.78 m$^2$/g and a design capacity of 2000 mAh.

EXAMPLE 4-5

A cell D5 of the present invention according to Example 4-5 was prepared in the same manner as Example 1-3 except that the bulk density of the positive electrode active material was made 3.4 g/cm$^3$. Note that the positive electrode active material had a relative surface area of 0.81 m$^2$/g and a design capacity of 2050 mAh.

EXAMPLE 4-6

A cell D6 of the present invention according to Example 4-6 was prepared in the same manner as Example 1-3 except that the bulk density of the positive electrode active material was made 3.7 g/cm³. Note that the positive electrode active material had a relative surface area of 0.90 m²/g and a design capacity of 2200 mAh.

COMPARATIVE EXAMPLE 4-1

A cell Z1 according to Comparative Example 4-1 was prepared in the same manner as Example 4-1 except that the same additives as Comparative Example 1-1 were used.

COMPARATIVE EXAMPLE 4-2

A cell Z2 according to Comparative Example 4-2 was prepared in the same manner as Example 4-2 except that the same additives as Comparative Example 1-1 were used.

COMPARATIVE EXAMPLE 4-3

A cell Z3 according to Comparative Example 4-3 was prepared in the same manner as Example 4-3 except that the same additives as Comparative Example 1-1 were used.

COMPARATIVE EXAMPLE 4-4

A cell Z4 according to Comparative Example 4-4 was prepared in the same manner as Example 4-4 except that the same additives as Comparative Example 1-1 were used.

COMPARATIVE EXAMPLE 4-5

A cell Z5 according to Comparative Example 4-5 was prepared in the same manner as Example 4-5 except that the same additives as Comparative Example 1-1 were used.

COMPARATIVE EXAMPLE 4-6

A cell Z6 according to Comparative Example 4-6 was prepared in the same manner as Example 4-6 except that the same additives as Comparative Example 1-1 were used.

With respect to the cells A1, D1 to D6, X1, and Z1 to Z6 thus prepared, high temperature cycle tests were conducted under the same conditions as Example 1 (with a constant current of 1 It (a current amount that can be extracted in one hour) even for a cell of different cell capacity).

Table 4 shows the bulk density of the positive electrode active material in relation to the results of the high temperature cycle tests and of the overcharge tests.

TABLE 4

| positive electrode bulk density (g/cm³) | relative surface area of positive active material (m²/g) | cycle characteristics capacity maintenance rate (%) | | | | maintenance rate difference |
|---|---|---|---|---|---|---|
| | | Comparative Example | | Example | | |
| 3.0 | 0.73 | Z1 | 84 | D1 | 87 | 3 |
| 3.1 | 0.74 | Z2 | 82 | D2 | 86 | 4 |
| 3.2 | 0.76 | Z3 | 82 | D3 | 88 | 6 |
| 3.3 | 0.78 | Z4 | 78 | D4 | 85 | 7 |
| 3.4 | 0.81 | X1 | 68 | A3 | 87 | 19 |
| 3.5 | 0.85 | Z5 | 61 | D5 | 83 | 24 |
| 3.7 | 0.90 | Z6 | 54 | D6 | 80 | 26 |

As shown in Table 4, among the cells A1 and D1 to D6 of the present invention and comparison cells X1 and Z1 to Z6, of which the bulk densities of the positive electrode active materials were the same, the present invention cells were superior in high temperature cycle characteristics over the comparison cells. The difference between the comparison cells and the present invention cells in high temperature cycle characteristics increased especially from the point where the bulk density of the positive electrode active material was 3.3 g/cm³ or more. Specifically, the comparison cells X1 and Z4 to Z6 had high-temperature cycle characteristics of 54 to 78%, while the present invention cells A3 and D4 to D6 had high-temperature cycle characteristics of 80 to 87%. In addition, the comparison cells X1, Z5 and Z6, of which the bulk densities of the positive electrode active materials were 3.4 g/cm³ or more, were inferior in high-temperature cycle characteristics by 19 percentage points or more to the present invention cells A3, D5, and D6, of which the bulk densities of the positive electrode active materials were the same as the comparison cells X1, Z5 and Z6. The comparison cells X1 and Z6, of which the bulk densities of the positive electrode active materials were 3.5 g/cm³ or more, were inferior in high temperature cycle characteristics by 24 percentage points or more to the present invention cells A3 and D6, of which the bulk densities of the positive electrode active materials were the same as the comparison cells X1 and Z6.

This can be explained as follows.

If the bulk density of the positive electrode active material is increased, so are cell capacity and local overcharge. The present invention cells, however, contain additives to alleviate local overcharge, and thus obtain sufficient high temperature cycle characteristics. On the other hand, the comparison cells do not contain additives to alleviate local overcharge, and thus allow the development of a reaction between the solvent and the electrodes, resulting in deterioration of cell characteristics. This difference becomes clearer from the point where the bulk density of the positive electrode active material is 3.3 g/cm³ or more. Thus, the bulk density of the positive electrode active material is preferably 3.3 g/cm³ or more, more preferably 3.4 g/cm³ or more, and particularly preferably 3.5 g/cm³ or more.

In order to increase the bulk density of the positive electrode active material as described above, it is necessary to increase the relative surface area of the active material (to decrease the size of active material particles). Thus, in order for the bulk density of the positive electrode active material to be 3.3 g/cm³ or more, the relative surface area of the active material is preferably 0.78 m²/g.

[Miscellaneous]

Although a cylindrical cell was exemplified in the above Examples, the present invention is not limited to this form; the present invention can be applied to cells with a variety of shapes such as coin-shaped cells, square-shaped cells, and laminate cells. It is also possible to apply the present invention to gel non-aqueous electrolyte secondary cells using polymer electrolyte.

The negative electrode material used herein can be natural graphite, carbon black, coke, glass carbon, carbon fiber, or carbonaceous substance of calcined structures thereof, or a mixture of the carbonaceous substance and one or more substances selected from the group consisting of lithiums, lithium alloys, and metal oxides capable of intercalating and deintercalating lithium.

The positive electrode material used herein can be one compound selected from transition metal compound oxides containing lithium, or a mixture of two or more thereof. Specifically, the examples include lithium cobalt oxide, lithium nickel oxide, lithium manganese oxide, lithium metal oxide, or oxides in which a part of the transition metal contained in the above oxides is substituted by another element.

The non-aqueous solvent used herein can be one compound or a mixture solvent of two or more compounds selected from the group consisting of ethylene carbonate, propylene carbonate, butylene carbonate, γ-butyrolactone, diethyl carbonate, dimethyl carbonate, ethyl methyl carbonate, 1, 2-dimethoxy ethane, tetrahydrofuran, anisole, 1, 4-dioxane, 4-methyl-2-pentanone, cyclohexanone, acetonitrile, propionitrile, dimethylformamide, sulfolane, methyl formate, ethyl formate, methyl acetate, ethyl acetate, propyl acetate, and ethyl propionate.

The electrolyte salt used herein can be one compound or a mixture solvent of two or more compounds selected from the group consisting of $LiN(C_2F_5SO_2)_2$, $LiN(CF_3SO_2)_2$, $LiClO_4$, $LiPF_6$, and $LiBF_4$. The amount of these electrolyte salts dissolved in the non-aqueous solvent is preferably 0.5 to 2.0 mol/liter.

In the above examples, such a cell was prepared that vinylene carbonate was used as the vinylene carbonate derivative, ethylene sulfite was used as the cyclic sulfite derivative, cyclohexylbenzene was used as the phenylcycloalkane derivative, and tert-amylbenzene was used as the alkylbenzene derivative having a quaternary carbon directly bonded to a benzene ring. However, the present invention is not limited to the above compounds; for example, the cell may be such that methyl vinylene carbonate or ethyl vinylene carbonate is used as the vinylene carbonate derivative, vinylene sulfite or methyl ethylene sulfite is used as the cyclic sulfite derivative, cyclopentylbenzene or cycloheptylbenzene is used as the cycloalkylbenzene derivative, and tert-butylbenzene or tert-hexylbenzene is used as the alkylbenzene derivative having a quaternary carbon directly bonded to a benzene ring. Such a cell also obtains satisfactory high temperature cycle characteristics, high temperature standing resistance, and safety without cell abnormality at the time of preventing overcharge.

As has been described above, the present invention realizes, by a simple means of adding additives in the non-aqueous electrolyte, a non-aqueous electrolyte cell that is excellent in high temperature cycle characteristics and high temperature standing resistance, and in safety without cell abnormality at the time of overcharge.

What is claimed is:

1. A non-aqueous electrolyte secondary cell comprising:
a positive electrode having a positive electrode active material intercalating and deintercalating lithium ions;
a negative electrode having a negative electrode active material intercalating and deintercalating lithium ions;
a non-aqueous electrolyte having a non-aqueous solvent and an electrolyte salt;
an outer casing can having mounted therein the positive electrode, the negative electrode, and the non-aqueous electrolyte, and having an opening portion; and
a sealing structure for sealing the opening portion and having a sealing plate;
wherein:
the positive electrode active material consists of a lithium cobalt oxide;
the positive electrode active material has a bulk density in the positive electrode of 3.3 g/cm³ or more; and
the non-aqueous electrolyte includes a vinylene carbonate compound represented by Chemical Formula 1, a cyclic sulfite compound represented by Chemical Formula 2 or 3, and a phenylcycloalkane compound,

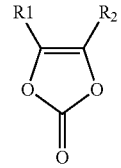

Chemical Formula 1 where R1 and R2 are independently a hydrogen atom or an alkyl group with two carbons or less,

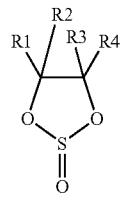

Chemical Formula 2 where R1 to R4 are independently a hydrogen atom or an alkyl group with two carbons or less,

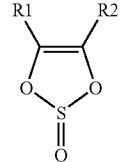

Chemical Formula 3 where R1 and R2 are independently a hydrogen atom or an alkyl group with two carbons or less.

2. The non-aqueous electrolyte secondary cell according to claim 1, wherein:
when a total mass of the non-aqueous solvent and the electrolyte salt is taken as 100, an amount of the vinylene carbonate compound is 0.5 to 3 parts by mass per 100 total mass of the non-aqueous solvent and the electrolyte salt; and
an amount of the cyclic sulfite compound is 0.1 to 2 parts by mass per 100 total mass of the non-aqueous solvent and the electrolyte salt.

3. The non-aqueous electrolyte secondary cell according to claim 2, wherein:

the vinylene carbonate compound is at least one selected from the group consisting of vinylene carbonate, methyl vinylene carbonate, and ethyl vinylene carbonate;

the cyclic sulfite compound is at least one selected from the group consisting of ethylene sulfite, vinylene sulfite, and methyl ethylene sulfite; and the phenylcycloalkane compound is at least one selected from the group consisting of phenylcyclohexane, phenylcycloheptane, and phenylcyclopentane.

4. The non-aqueous electrolyte secondary cell according to claim 3, wherein:

the amount of the phenylcycloalkane compound being 0.2 to 3 parts by mass per 100 total mass of the non-aqueous solvent and the electrolyte salt.

5. A non-aqueous electrolyte secondary cell comprising:

a positive electrode having a positive electrode active material intercalating and deintercalating lithium ions;

a negative electrode having a negative electrode active material intercalating and deintercalating lithium ions;

a non-aqueous electrolyte having a non-aqueous solvent and an electrolyte salt;

an outer casing can having mounted therein the positive electrode, the negative electrode, and the non-aqueous electrolyte, and having an opening portion; and a sealing structure for sealing the opening portion and having a sealing plate;

wherein the positive electrode active material consists of a lithium cobalt oxide;

the positive electrode active material has a bulk density in the positive electrode of 3.3 g/cm³ or more; and the non-aqueous electrolyte includes a vinylene carbonate compound represented by Chemical Formula 1, a cyclic sulfite compound represented by Chemical Formula 2 or 3, a phenylcycloalkane compound, and an alkylbenzene compound having a quaternary carbon directly bonded to a benzene ring,

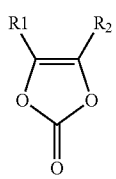

Chemical Formula 1 where R1 and R2 are independently a hydrogen atom or an alkyl group with two carbons or less,

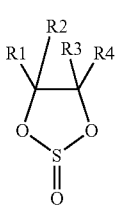

Chemical Formula 2 where R1 to R4 are independently a hydrogen atom or an alkyl group with two carbons or less,

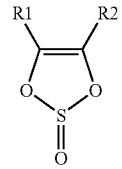

Chemical Formula 3 where R1 and R2 are independently a hydrogen atom or an alkyl group with two carbons or less.

6. The non-aqueous electrolyte secondary cell according to claim 5, wherein:

when a total mass of the non-aqueous solvent and the electrolyte salt is taken as 100, an amount of the vinylene carbonate compound is 0.5 to 3 parts by mass per 100 total mass of the non-aqueous solvent and the electrolyte salt; and an amount of the cyclic sulfite compound is 0.1 to 2 parts by mass per 100 total mass of the non-aqueous solvent and the electrolyte salt.

7. The non-aqueous electrolyte secondary cell according to claim 6, wherein:

the vinylene carbonate compound is at least one selected from the group consisting of vinylene carbonate, methyl vinylene carbonate, and ethyl vinylene carbonate;

the cyclic sulfite compound is at least one selected from the group consisting of ethylene sulfite, vinylene sulfite, and methyl ethylene sulfite;

the phenylcycloalkane compound is at least one selected from the group consisting of phenylcyclohexane, phenylcycloheptane, and phenylcyclopentane; and the alkylbenzene compound is at least one selected from the group consisting of tert-butylbenzene, tert-amylbenzene, and tert-hexylbenzene.

8. The non-aqueous electrolyte secondary cell according to claim 7, wherein a total amount of the phenylcycloalkane compound and the alkylbenzene compound is 0.2 to 3 parts by mass per 100 total mass of the non-aqueous solvent and the electrolyte salt.

9. A non-aqueous electrolyte secondary cell comprising:

a positive electrode having a positive electrode active material intercalating and deintercalating lithium ions;

a negative electrode having a negative electrode active material intercalating and deintercalating lithium ions;

a non-aqueous electrolyte having a non-aqueous solvent and an electrolyte salt;

an outer casing can having mounted therein the positive electrode, the negative electrode, and the non-aqueous electrolyte, and having an opening portion; and a sealing structure for sealing the opening portion and having a sealing plate;

wherein:

the positive electrode active material consists of a lithium cobalt oxide, the positive electrode active material has a bulk density in the positive electrode of 3.3 g/cm³ or more; and the non-aqueous electrolyte includes a vinylene carbonate compound represented by Chemical Formula 1, a cyclic sulfite compound represented by Chemical Formula 2 or 3, and an alkylbenzene compound having a quaternary carbon directly bonded to a benzene ring:

Chemical Formula 1

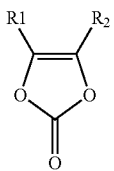

where R1 and R2 are independently a hydrogen atom or an alkyl group with two carbons or less, Chemical Formula 2

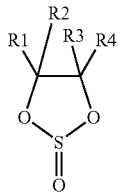

where R1 to R4 are independently a hydrogen atom or an alkyl group with two carbons or less, Chemical Formula 3

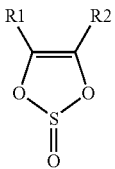

where R1 and R2 are independently a hydrogen atom or an alkyl group with two carbons or less.

10. The non-aqueous electrolyte secondary cell according to claim 9, wherein:

when a total mass of the non-aqueous solvent and the electrolyte salt is taken as 100, an amount of the vinylene carbonate compound is 0.5 to 3 parts by mass per 100 total mass of the non-aqueous solvent and the electrolyte salt; and an amount of the cyclic sulfite compound is 0.1 to 2 parts by mass per 100 total mass of the non-aqueous solvent and the electrolyte salt.

11. The non-aqueous electrolyte secondary cell according to claim 10, wherein:

the vinylene carbonate compound is at least one selected from the group consisting of vinylene carbonate, methyl vinylene carbonate, and ethyl vinylene carbonate;

the cyclic sulfite compound is at least one selected from the group consisting of ethylene sulfite, vinylene sulfite, and methyl ethylene sulfite:

the phenylcycloalkane compound is at least one selected from the group consisting of phenylcyclohexane, phenylcycloheptane, and phenylcyclopentane; and the alkylbenzene compound is at least one selected from the group consisting of tert-butylbenzene, tert-amylbenzene, and tert-hexylbenzene.

\* \* \* \* \*